United States Patent [19]

Pauls

[11] 4,122,572

[45] Oct. 31, 1978

[54] ADVANCING MECHANISM FOR AUTOMATIC SCREW THREAD CUTTING MACHINES

[75] Inventor: Kurt Pauls, Langenfeld, Fed. Rep. of Germany

[73] Assignee: Kieserling & Albrecht, Solingen, Fed. Rep. of Germany

[21] Appl. No.: 819,827

[22] Filed: Jul. 28, 1977

[30] Foreign Application Priority Data

Aug. 27, 1976 [DE] Fed. Rep. of Germany ....... 2638626

[51] Int. Cl.$^2$ .......................... B23G 11/00; B23Q 5/26
[52] U.S. Cl. ........................................ 10/105; 408/63; 408/130
[58] Field of Search ............. 10/105, 139 R, 139 WH; 408/63, 64, 130, 702

[56] References Cited

U.S. PATENT DOCUMENTS

| | | | |
|---|---|---|---|
| 1,444,109 | 2/1923 | Clay | 408/63 X |
| 1,460,088 | 6/1923 | Wilson | 10/105 |
| 2,051,052 | 8/1936 | Morgan | 10/139 R |
| 2,514,775 | 7/1950 | Mackintosh | 408/63 |
| 3,071,989 | 1/1963 | Timm | 408/130 X |

FOREIGN PATENT DOCUMENTS

694,221  7/1953  United Kingdom ..................... 10/105

*Primary Examiner*—E. M. Combs
*Attorney, Agent, or Firm*—Michael J. Striker

[57] ABSTRACT

In an automatic screw thread cutting machine having a clamping carriage for clamping an elongated workpiece, one end portion of which is to be provided with a screw thread, and a spindle coaxially arranged with a workpiece held by said clamping carriage and carrying at one end thereof facing the end portion of the workpiece a screw cutting tool and being driven over a stepdown gearing from a motor, an advancing mechanism for advancing the clamping carriage towards said spindle and including a rod connected to the carriage and having a pair of opposite smooth parallel friction surfaces and a friction wheel driven by the spindle and pressed against one of the friction surfaces while the other friction surface is engaged by a counter roll. The friction wheel is exchangeble against a friction wheel of different diameter to thereby change the speed of advancement of the carriage.

8 Claims, 2 Drawing Figures

ADVANCING MECHANISM FOR AUTOMATIC SCREW THREAD CUTTING MACHINES

BACKGROUND OF THE INVENTION

The present invention relates to an advancing mechanism for an automatic screw thread cutting machine which comprises a machine bed, a clamping carriage movable on the machine bed, at least one drive motor, a speed reducing gearing and a spindle with a thread cutting tool connected thereto, whereby the advancing mechanism, provided with at least one speed reducing gearing, connects the clamping carriage with a drive.

In screw thread cutting machines of the aforementioned kind, the adjustment of the advance of the clamping carriage for the desired thread pitch and length has been complicated and expensive. For this purpose changeover gears respectively cam controls have been necessary, which was either constructively disadvantageous or required stock keeping of a large amount of parts since various gears or cams had to be kept in stock for each screw thread of different pitch to be cut into the workpiece.

SUMMARY OF THE INVENTION

It is an object of the present invention to provide a constructive especially simple solution to obtain a desired advance of the clamping carriage, respectively of the workpiece clamped therein, for a screw thread of any desired pitch to be cut into the front end portion of the workpiece and in which the advancing mechanism for the clamping carriage can be constructed with a minimum of expenditures.

These objects of the present invention are obtained in that at least one wheel of the advancing mechanism is constructed as an exchangeable friction wheel with which a friction surface is coordinated. At a change of the desired advance of the workpiece it is only necessary to exchange the friction wheel. Such a friction wheel is very simple in construction and can be manufactured with a minimum of cost.

According to a feature of the present invention the friction surface coordinated with the friction wheel may comprise an elongated rod connected in the region of one end to the clamping carriage and having two opposite smooth and parallel friction surfaces, one of which is engaged by the friction wheel, while a counterpressure roll opposite the friction wheel engages the other of the two parallel surfaces of the rod. This will result in a simplification of the rod itself which, according to the prior art had to be constructed as a rack or as a threaded spindle. The force necessary for moving the clamping carriage is so small that with the construction of the present invention a practically slipless friction contact is obtained. In addition, an eventually occurring small slip during movement of the workpiece into the preferably used chasing tool has no influence on the tolerance of the thread to be produced, so that a minimal slip can be accepted.

To compensate for different diameters of the friction wheel and to obtain any desired pitch of the thread to be cut, the friction wheel is movably mounted and pressed by means connected thereto against the mentioned friction surface of the rod. The means for pressing the friction wheel against the aforementioned friction surface preferably comprises fluid operated cylinder-and-piston means. Additional means for the transposition to a different fricton wheel diameter, respectively to a changed pitch of the screw thread to be cut, are not necessary. Especially additional couplings, as are necessary in prior-art constructions, to avoid the difficulties during engagement of a gear and a rack, become unnecessary with the construction according to the present invention.

According to a further feature of the present invention, the drive of the clamping carriage, respectively of the advancing mechanism from the drive of the spindle occurs over a gear unit having two gears the axes of which extend transverse to each other and this gear unit is preferably a worm gear unit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
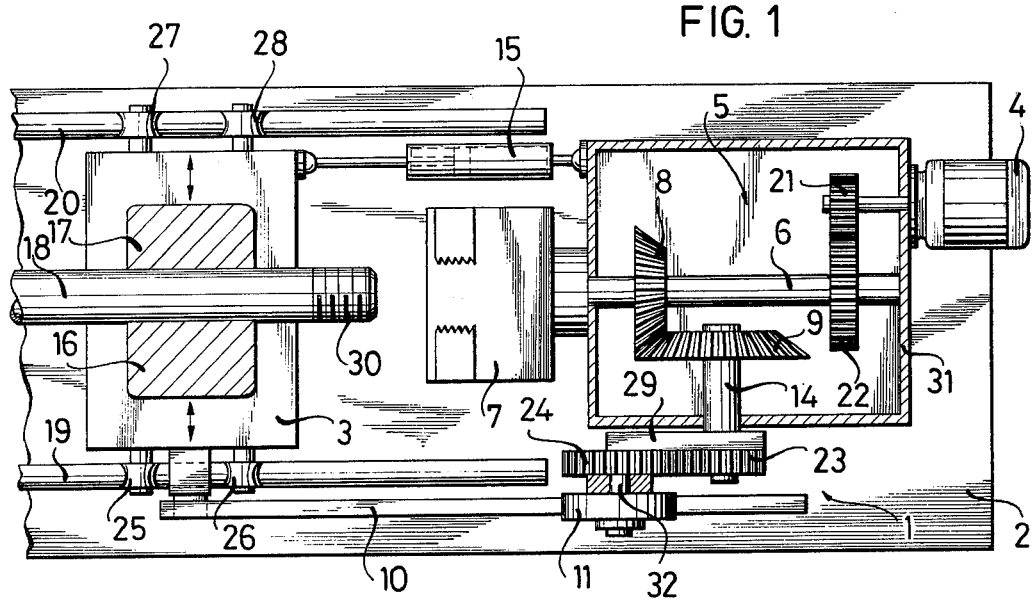
FIG. 1 is a schematic top view of the screw thread cutting machine according to the present invention.

FIG. 1 schematically illustrates an advancing mechanism 1, a machine bed 2, a clamping carriage 3 movably mounted on the machine bed 2, a drive motor 4, a reduction gearing 5 between the drive motor 4 and a spindle 6 and a screw cutting tool 7 mounted on the end of the spindle facing the clamping carriage 3.

The clamping carriage 3 is provided with wheels 25–28, which are movable on rails 19 and 20 extending parallel to the axis of the spindle 6. The clamping carriage 3 is provided with a pair of clamping jaws 16 and 17, movable in the direction of the double-headed arrows toward and away from each other, to clamp thereby an elongated workpiece 18, for instance a tube or circular rod, which had to be provided at an end portion thereof with a screw thread 30. The spindle 6 is mounted in a machine housing 31 which, in the illustrated embodiment, is fixed to the machine bed 2, projecting upwardly therefrom and the spindle 6 is driven from a motor 4, for instance an electric motor over spur gears 21 and 22, respectively fixed to the output shaft of the motor 4 and to the spindle 6, and forming part of a speed reducing unit. The advancing mechanism 1 comprises an angle drive comprising the gears 8 and 9 which may be constructed, as shown, as bevel gears or as worm gears, one of which is fixed to the spindle 6 for rotation therewith, whereas the gear 9, meshing with the gear 8, is fixed to the shaft 14 having an axis normal to the axis of the spindle 6. The shaft 14 carries, at an end portion thereof projecting beyond the housing 31, a side bar 29 freely turnable on the shaft 14 and the bar 29 carries at the free end thereof a shaft 32 extending parallel to the shaft 14. The shaft 14 further carries, on its end portion projecting beyond the side bar 29, a gear 23 fixed thereto for rotation therewith, which in turn meshes with a gear 24 fixed to the shaft 32 for rotation therewith. Removably fixed to a portion of the shaft 32 projecting beyond the gear 24 is a friction wheel 11 for rotation with the shaft 32. The friction wheel 11 is pressed, by means of fluid operated cylinder-and-piston means 13 connected to the shaft 32, against the flat upper friction surface 10a of an elongated rod 10 of rectangular cross-section, which in the region of one end thereof is fixed to the clamping carriage 3. The lower surface 10b of the rod 10, which extends parallel to the upper surface 10a thereof, is engaged by a counterpressure roll 12 rotatably mounted in any convenient manner on the housing 31.

Figure 2:
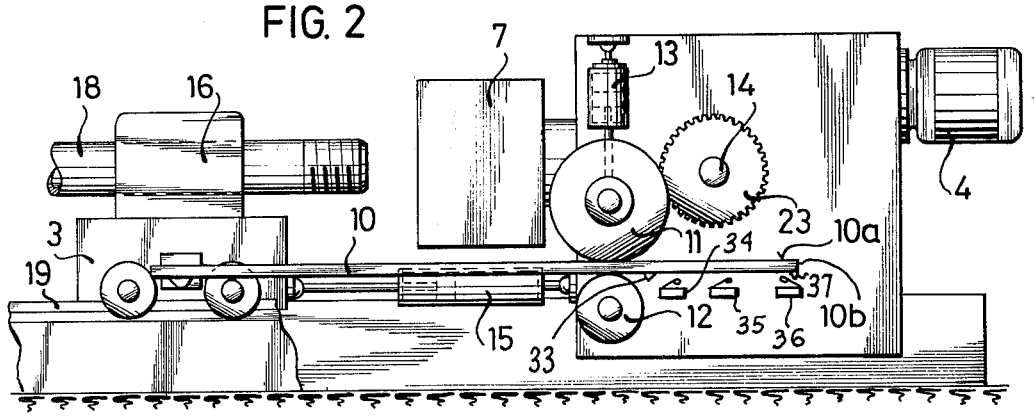
FIG. 2 is a side view of the machine.

Fluid operated cylinder-and-piston means 15 are arranged between the clamping carriage 3 and the machine housing 31, for moving the clamping carriage 3 toward the machine housing, during part of the movement of the clamping carriage 3 before engagement of the end portion of the workpiece 18 with the screw threading tool 7. The rod 10 is provided at an end portion thereof projecting in the position shown in FIGS. 1 and 2 beyond the friction wheel 11 with cam portions 33 and 37 adapted to cooperate with three microswitches 34, 35 and 36 on the machine bed, for a purpose as will be described later on.

The above-described machine will operate as follows:

At the start of the operation the workpiece 18 clamped between the clamping jaws 16 and 17 of the clamping carriage 3 is in the position as shown in the drawing. Pressure fluid is then fed to the left side, as viewed in FIG. 1, to the piston of the cylinder-and-piston means 15, so that the clamping carriage 3 and the workpiece 18 clamped thereon is advanced in the axial direction of the elongated workpiece 18 toward the threading tool 7. Shortly before the end portion of the workpiece 18, projecting beyond the clamping carriage 3, is engaged by the screw thread cutting tools 7, the cam portion 33 on the rod 10 engages the microswitch 34 which actuates, in a manner well known in the art, the cylinder-and-piston means 13 to thereby press the friction wheel 11 against the friction surface 10a on the rod 10, while deactivating the cylinder-and-piston means 15, so that the clamping carriage 3 is now advanced by the advancing mechanism 1 which is driven from the motor 4 over the spur gears 21 and 22, the spindle 6, the bevel or worm gears 8 and 9, the shaft 14, the gears 23 and 24 of which the latter, fixed to the shaft 32, drives the friction wheel 11, which is pressed by the cylinder-and-piston means 13 against the friction surface 10a of the rod 10. The friction wheel 11 driven with a predetermined speed engages with its peripheral surface the upper friction surface 10a of the rod 10 and determines therewith the advancing speed of the clamping carriage and the workpiece held thereby, to thus determine the pitch of the screw thread 30 to be cut at the end portion of the workpiece 18. After the clamping carriage 3 has advanced during the screw cutting operation through a predetermined distance, the cam portion 33 on the rod 10 engages the microswitch 35 whereby, in a manner known per se, valves not shown in the drawing are operated to feed pressure fluid below the piston of the cylinder-and-piston means 13 to thereby disengage the friction wheel 11 from the friction surface 10a and to feed simultaneously pressure fluid against the right side of the piston in the cylinder-and-piston means 15, so that the carriage 3 is moved back to its starting position. An additional cam portion 37 at the free end of the rod 10 engages the microswitch 36 when the carriage arrives at the position as shown in FIG. 1 to thereby stop, in a manner known per se, over a valve not shown in the drawing, feeding of further pressure fluid into the cylinder-and-piston means 15.

The means for engaging the knife or knives of the schematically illustrated threading tool 7 with the workpiece and to disengage the same after a thread of predetermined length has been cut on the end portion of the workpiece, do not form part of the present invention and such means are well known in the art, as for instance disclosed in the German Auslegesschrift No. 1,080,381.

If a thread of different pitch has to be cut on the end portion of the workpiece 18, the friction wheel 11 is removed from the shaft 32 and a friction wheel of different diameter is fixedly attached thereto.

It will be understood that each of the elements described above, or two or more together, may also find a useful application in other types of advancing mechanism for automatic screw thread cutting machines, differing from the types described above.

While the invention has been illustrated and described as embodied in an advancing mechanism for an automatic screw thread cutting machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

I claim:

1. In an automatic screw thread cutting machine, a combination comprising support means; clamping means mounted on said support means and adapted to carry an elongated workpiece; machine housing means mounted on said support means; a spindle mounted in said machine housing means for rotation about its axis and being arranged coaxial with a workpiece carried by said clamping means axially spaced therefrom, one of said two means mounted on said support means being movable in direction of said axis towards the other of said two means; a threading tool carried by an end of said spindle facing said clamping means; a drive motor; a speed reducing transmission between said drive motor and said spindle; and advancing means for moving said one of the two means mounted on said support means towards the other of said two means and including at least one exchangeable friction wheel having a smooth peripheral friction surface, a further speed reducing transmission means between said spindle and said friction wheel, and a friction surface extending in said direction, engaging with said friction wheel and connected to one of the first-mentioned two means.

2. A combination as defined in claim 1, wherein said clamping means comprises a clamping carriage movable in said direction on said support means, said machine housing means being fixedly mounted on said support means and said friction surface being connected to said clamping carriage for movement in said direction.

3. A combination as defined in claim 2, and including a rod extending in said direction and connected to said clamping carriage, said rod having a pair of smooth and parallel opposite surfaces, one of which constituting said friction surface which is engaged by said friction wheel, and a counterpressure roll engaging the other of said opposite surface of said rod.

4. A combination as defined in claim 3, wherein said counterpressure roll is located opposite said friction roll.

5. A combination as defined in claim 3, and including means mounting said friction wheel movable toward and away from said friction surface and means cooperating with said friction wheel for pressing the latter against said friction surface.

6. A combination as defined in claim 5, wherein said friction wheel is removably mounted on said mounting means to be exchangeable against a friction wheel of different diameter.

7. A combination as defined in claim 1, wherein said further speed reducing transmission between said spindle and said friction wheel includes gear means comprising at least two gears having axes extending transverse to each other.

8. A combination as defined in claim 2, wherein said support means comprises a bed plate and rails extending in said direction and fixed to said bed plate, and clamping carriage being provided with wheels movable along said rails.

* * * * *